United States Patent [19]

Simpson et al.

[11] Patent Number: 5,363,889
[45] Date of Patent: Nov. 15, 1994

[54] FUEL DISPENSING NOZZLE ASSEMBLY

[75] Inventors: W. Dwain Simpson, Wilton; James H. Pyle, Weston, both of Conn.

[73] Assignee: Saber Equipment Corporation, Fairfield, Conn.

[21] Appl. No.: 105,375

[22] Filed: Aug. 11, 1993

Related U.S. Application Data

[63] Continuation-in-part of Ser. No. 931,696, Aug. 18, 1992, abandoned, which is a continuation-in-part of Ser. No. 496,219, Mar. 20, 1990, Pat. No. 5,184,309.

[51] Int. Cl.⁵ ............................................. B67D 5/373
[52] U.S. Cl. ................................. 141/208; 141/206; 141/59; 141/302; 141/392; 137/68.1; 403/2; 403/341
[58] Field of Search ................ 141/206–211, 141/214, 215, 382, 392, 45, 59, 301, 302; 137/68.1, 71, 454.2–454.6, 797; 285/3, 4; 403/2, 24, 375, 341, 383

[56] References Cited

U.S. PATENT DOCUMENTS

| | | | |
|---|---|---|---|
| 2,758,768 | 8/1956 | Payne | 137/454.5 X |
| 3,513,887 | 5/1970 | Limandri | 141/207 |
| 4,351,375 | 9/1983 | Polson | 141/392 X |
| 4,418,730 | 12/1983 | McMath | 141/207 |
| 5,004,023 | 4/1991 | Monticup, Jr. et al. | 141/208 |

*Primary Examiner*—J. Casimer Jacyna
*Attorney, Agent, or Firm*—Gottlieb, Rackman & Reisman

[57] ABSTRACT

A fuel dispensing nozzle including three calculated break points is provided. The first break point is provided in the spout which is calculated to fracture upon application of a force orthogonal to the axial direction of the spout. The nozzle comprises a housing having at least one opening for a dispensing valve to be selectively removably received within. A coupling or maintaining member is provided for maintaining the dispensing valve within the housing. The maintaining member is adapted to withstand application of a pre-determined force tending to separate the dispensing valve from the housing. The maintaining member allows separation of the housing and dispensing valve when the pre-determined force is exceeded. This maintaining member is the second break point. The third breakaway feature is provided in the construction of the housing which is designed to fracture prior to fracture of the gas pump or hose if the first or second break points do not fracture.

36 Claims, 7 Drawing Sheets

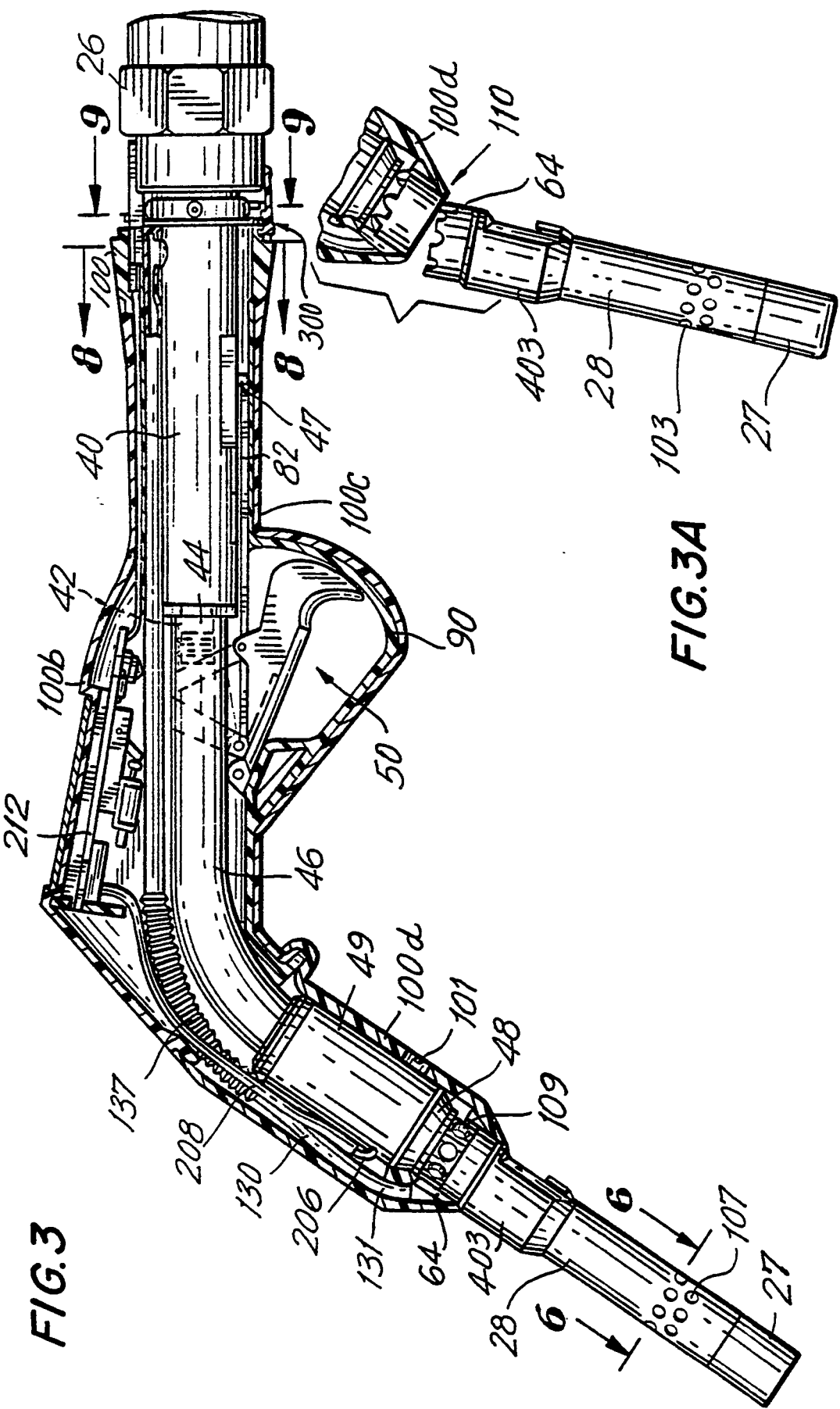

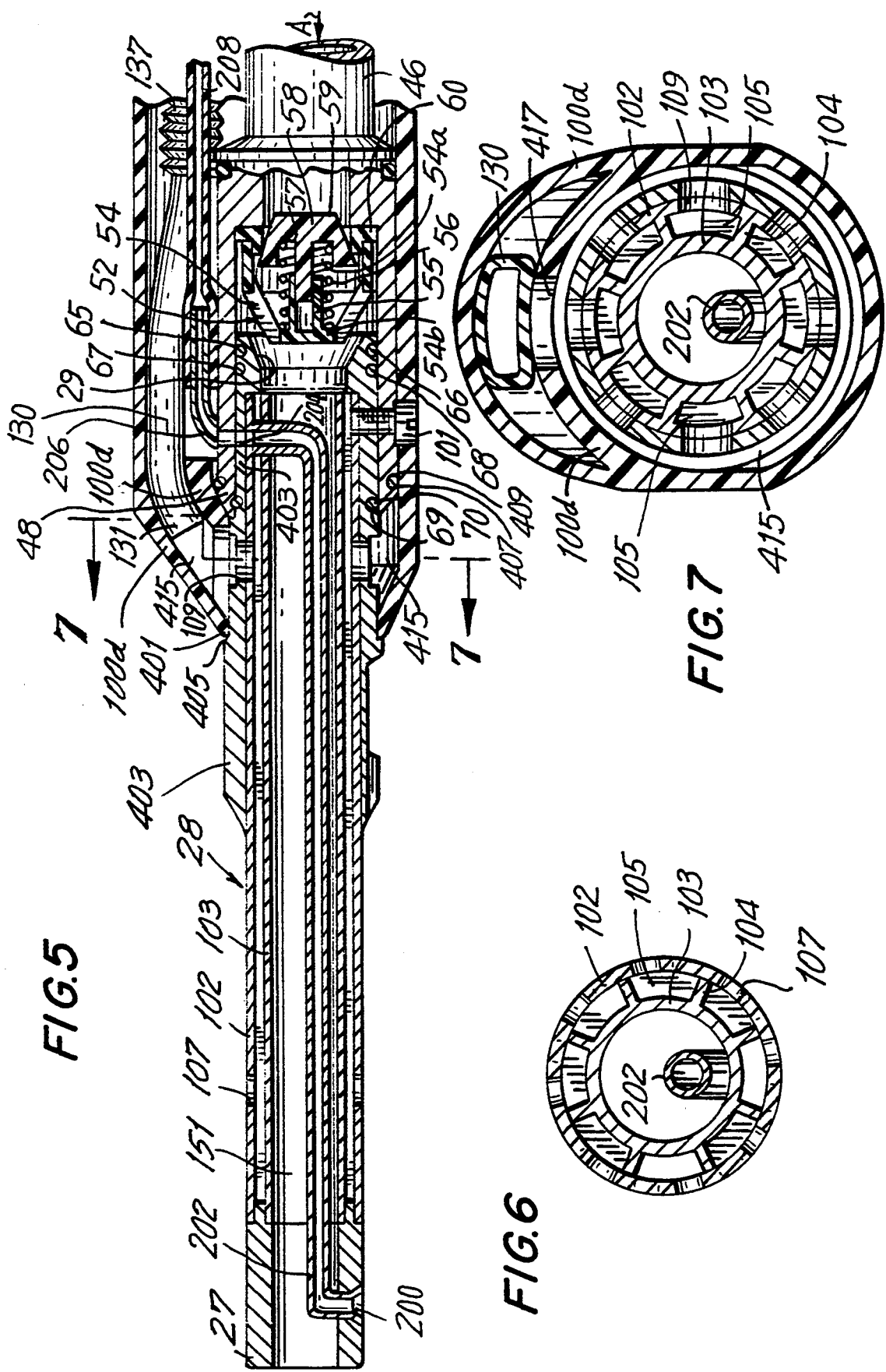

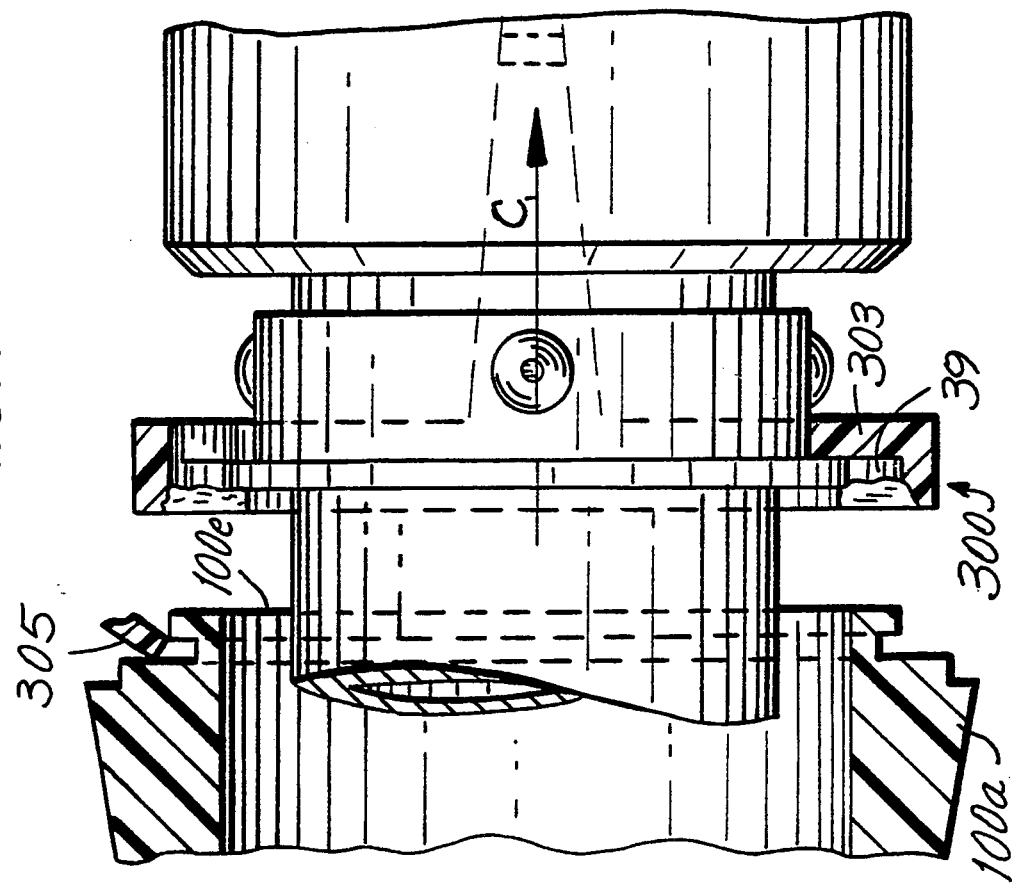
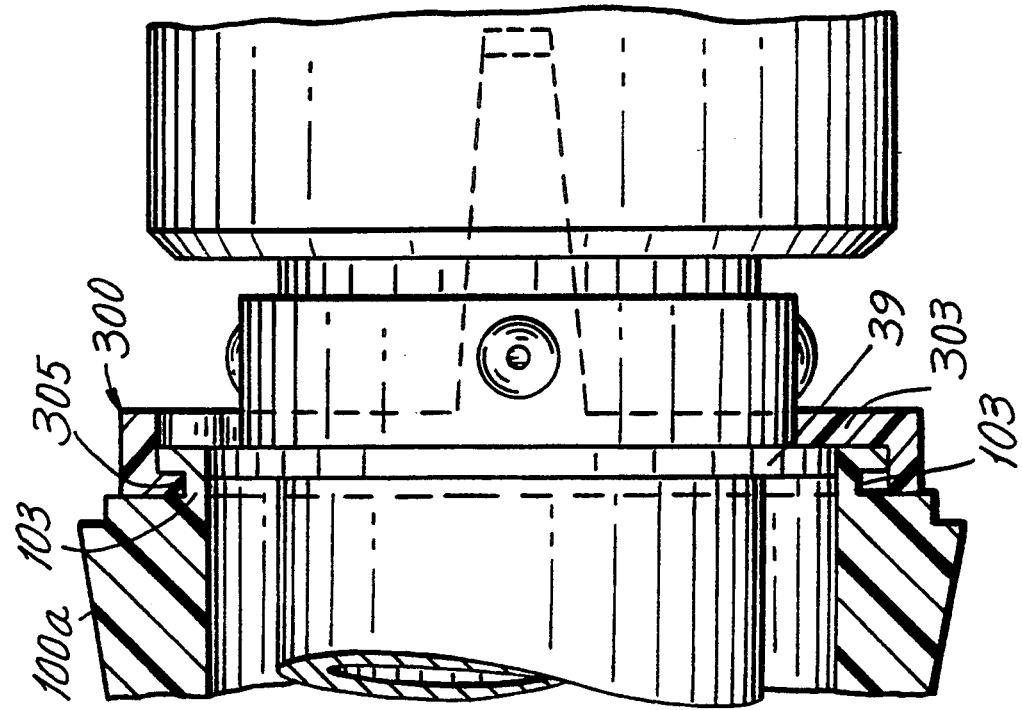

FUEL DISPENSING NOZZLE ASSEMBLY

CROSS REFERENCE TO RELATED MATTERS

This application is a continuation-in-part application based upon co-pending U.S. patent application Ser. No. 07/931,696 filed Aug. 18, 1992 for BREAKAWAY VALVE, now abandoned, which was a continuation-in-part application of U.S. patent application Ser. No. 496,219, filed Mar. 20, 1990, now U.S. Pat. No. 5,184,309.

BACKGROUND OF THE INVENTION

The present invention relates to fuel dispensing nozzles, and more particularly, to an improved fuel dispensing nozzle having breakaway features to protect the fuel dispensing system during "driveaway". The "driveaway" problem is a term used in the art to describe the problem of gasoline consumers mistakenly driving away from a gas pump with the fuel dispensing nozzle within the inlet pipe to the gas tank of their automobile.

Typically, fuel dispensing nozzles have a substantially gun shaped configuration having an outlet tube or spout that is readily insertable into an automobile gas tank and a trigger for selectively dispensing fuel through the nozzle assembly. The fuel dispensing nozzle is coupled to a fuel dispensing hose which is in turn coupled to a fuel dispenser (i.e. gas pump). The present invention is designed to protect the fuel dispensing system during "driveaway".

A first generation cure for the "driveaway" problem was to provide a breakaway type valve within the fuel dispensing hose, so that when an automobile drives away with the dispensing nozzle within the inlet pipe of the automobile, the hose broke down at the breakaway valve and no damage was done to the automobile or gas pump. The gasoline vendor saved his pump, but lost a valuable nozzle as well as the expensive distribution hose. The breakaway valve was configured so that at least the pump end of the distribution hose would immediately be sealed at the breakaway valve so that the excess fuel in the section of the hose between the break point and gas pump did not leak out as the car drove away. Furthermore, if a valve is provided in the hose to prevent fuel flow out of the hose between the nozzle assembly and break point, it would cost more than the benefit derived since it would be lost with each breakaway. This system is also inadequate because too much of the mechanical portion of the gasoline pump (i.e., part of the distribution hose and the entire nozzle assembly) was lost with each driveaway, and this resulted in undue expense to the end user.

U.S. Pat. No. 5,004,023 (Monticup Jr. et al.) teaches a gasoline nozzle with emergency shut-off valve. This reference discloses a gasoline nozzle with a breakaway outlet portion and an emergency shut-off mechanism. Specifically, Monticup Jr. et al. discloses a breakaway nut that couples the fluid outlet tube to the nozzle body. This breakaway nut includes a weak spot so that upon application of the breaking force, the fluid outlet tube separates from the nozzle body. This arrangement requires the nozzle body to increase in size because an additional part not required by the present invention is required. Furthermore, this arrangement must result in different breakaway strengths in varying directions. Although the reference does not disclose in what direction this breakaway feature is most suited, it appears that the breakaway feature would break most easily when a force perpendicular to the axial direction of fluid flow is exerted.

None of the prior art arrangements satisfies the need for a gasoline nozzle assembly, wherein the gasoline nozzle includes breakaway features so that breakaway occurs at predetermined forces in all directions, and allowing a maximal amount of the gasoline nozzle assembly to be saved, and also preventing damage to the remaining gasoline system, or the consumer's automobile.

SUMMARY OF THE INVENTION

Generally speaking, and in accordance with the instant invention, a fuel dispensing nozzle is provided. The fuel dispensing nozzle includes a housing and a dispensing valve assembly releasably securable within the housing. The dispensing valve is designed to release from the housing upon application of a predetermined force in a direction axial to fluid flow through the valve. An outlet tube is coupled to the dispensing valve, which receives fluid dispensed through the valve and discharges it into, for example, an automobile gas tank. The outlet tube is designed to break upon application of a predetermined force in a direction substantially orthogonal to fluid flow through the outlet tube.

A coupling member is provided for securing the dispensing valve assembly within the housing. The coupling member is formed to withstand a predetermined force tending to separate the dispensing valve from the housing; the coupling member allows separation of the housing and dispensing valve assembly when a predetermined force is exceeded.

Accordingly, it is an object of the invention to provide an improved fuel dispensing nozzle with multiple breakaway features.

A further object of the invention is to provide a fuel dispensing nozzle having a breakaway feature in the outlet tube portion that allows the outlet tube to break down when a force, above a predetermined force, is applied in a direction substantially orthogonal to the direction of fluid flow through the outlet tube.

Yet another object of the invention is to provide an improved fuel dispensing nozzle that includes a breakaway feature when a force, above a predetermined force, is applied in a direction axial to fluid flow through the dispensing valve assembly.

Still another object of the invention is to provide a coupling clip having a predetermined strength that breaks when a force above that of a predetermined strength is applied thereto.

Still other objects and advantages of the invention will in part the obvious and will in part be apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 3 is a side elevational view in partial cross-section showing the nozzle assembly of the invention in assembled condition;

FIG. 3A is a side elevational view showing the breakaway feature in the spout of the nozzle assembly;

FIG. 5 is a cross-sectional view taken along line 5—5 of FIG. 3 and shows the engagement of the spout to the nozzle;

FIG. 6 is a cross-sectional view taken along line 6—6 of FIG. 3 and illustrates the gas vapor channel of the spout;

FIG. 7 is a cross-sectional view taken along line 7—7 of FIG. 5 and depicts the breakaway portion of the spout;

FIG. 10 is a cross-sectional view taken along lines 10—10 of FIG. 9 and illustrates the breakaway valve connecting the nozzle assembly to the housing;

FIG. 10A is a cross-sectional view taken along line 10—10 of the FIG. 9 and depicts the breakaway valve after breakaway, with the nozzle assembly partially removed from the housing.

DETAILED DESCRIPTION OF THE PREFERRED EMBODIMENTS

Figure 1:
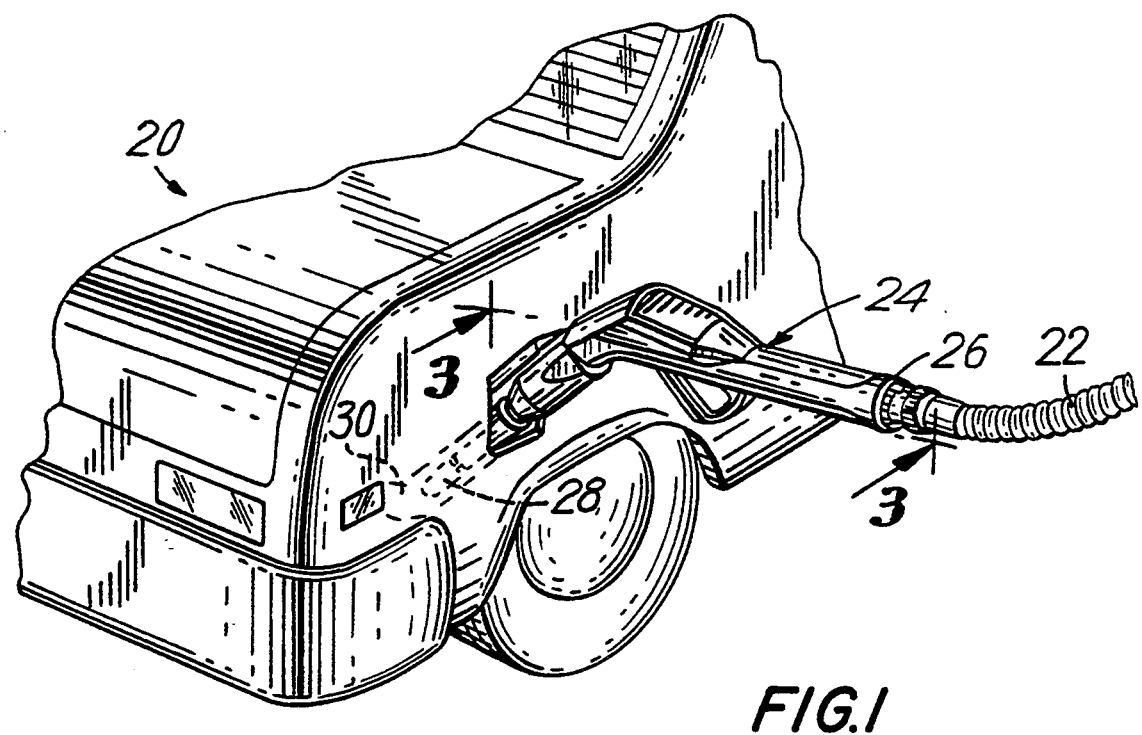
FIG. 1 is a partial perspective view showing, in general, the delivery of gasoline to an automobile using a fuel dispensing nozzle in accordance with the preferred embodiment of the invention.

Reference is now made to FIG. 1, which illustrates an automobile generally indicated at 20 for receiving gasoline from a gas pump (not shown). The gas pump is connected to a distribution hose 22 which in turn is connected to a nozzle assembly generally indicated as 24. Nozzle assembly 24 include a receiving end 26 which is coupled to distribution hose 22 and a spout 28 opposite receiving end 26. Spout 28 is depicted within inlet tube 30 (shown in phantom) of automobile 20.

Figure 2:
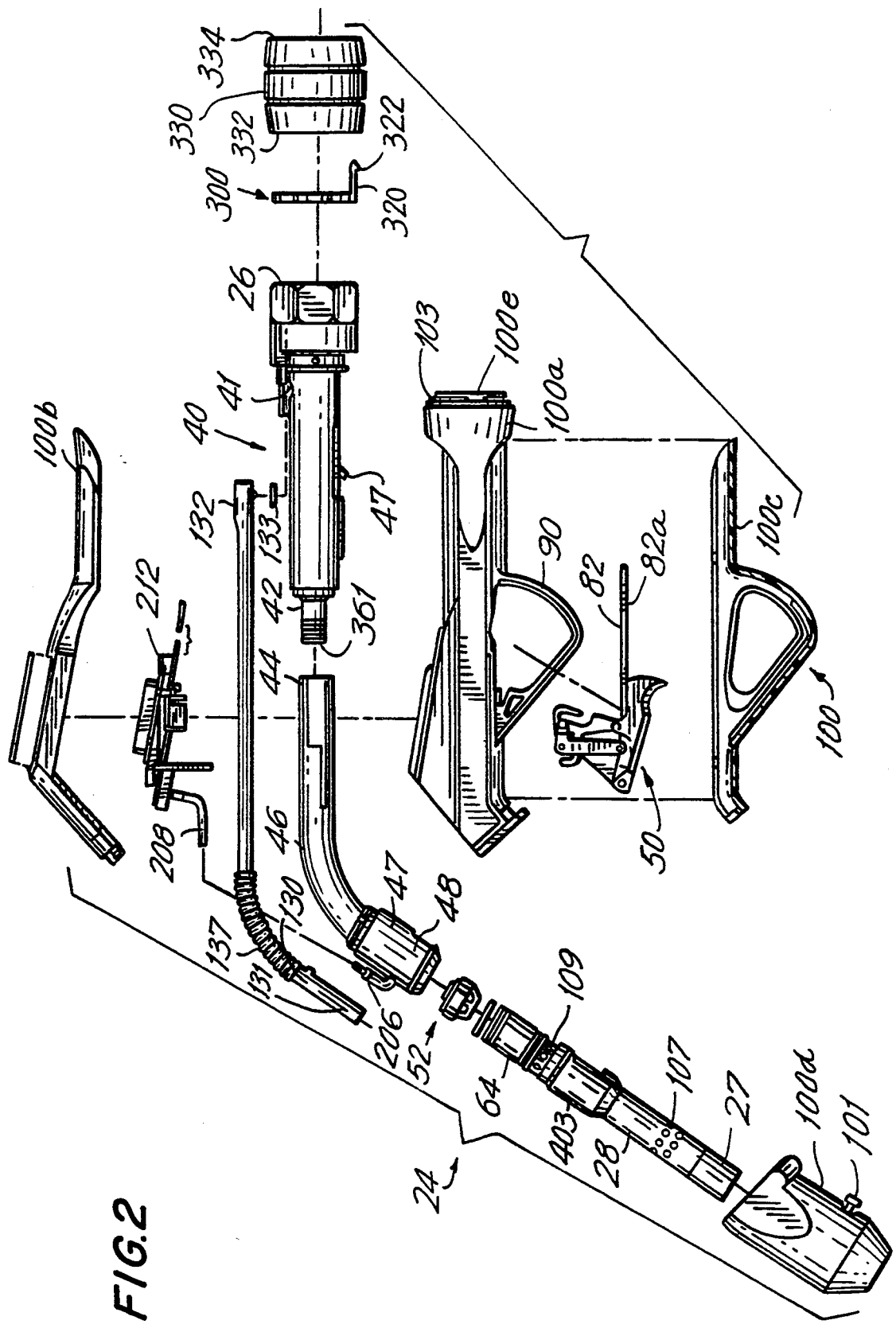
FIG. 2 is an exploded side elevational view showing the various component parts of the fuel dispensing nozzle assembly of the invention.
Figure 9:
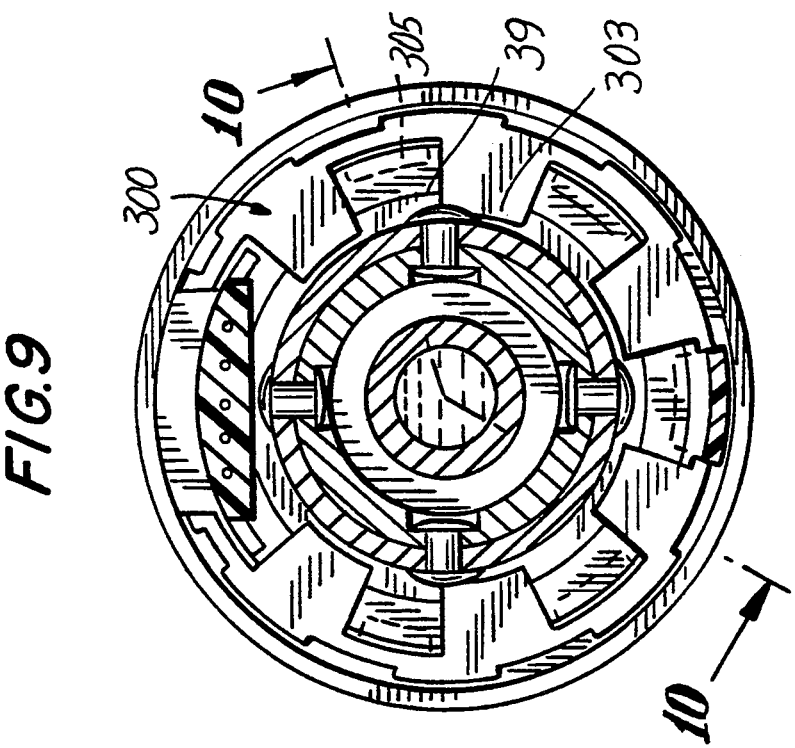
FIG. 9 is a cross-sectional view taken along line 9—9 of FIG. 3 and is directed to the breakaway ring of FIG. 4 and its use in the nozzle assembly.

With reference to FIGS. 2, 3 and 5, there are generally three related functions being performed by nozzle assembly 24. Firstly, nozzle assembly 24 performs fluid dispensation, wherein fluid is received at receiving end 26 of nozzle assembly 24 and is dispensed at dispensing end 27 of spout 28. Secondly, nozzle assembly 24 removes gasoline vapor from the gas tank of automobile 20; the vapor then travels through assembly 24 in a direction opposite fluid flow and is stored in a storage tank (not shown). Thirdly, nozzle assembly 24 senses the fluid level within the gas tank, such that when the fluid level rises to a predetermined point, fluid dispensation is automatically cut off. These three functions are described in detail below.

Referring specifically to FIGS. 2 and 3, nozzle assembly 24 is generally constructed with a housing, generally indicated at 100, which houses a trigger assembly, generally indicated at 50. Trigger assembly 50 operates a valve assembly 40 to allow fluid to flow therethrough. Fluid flows through valve assembly 40, flow tube 46 and spout 28. Vapor is collected through spout 28, vapor tube 130 and valve assembly 40. The automatic shut off of fluid is sensed to determine when the fluid has reached a predetermined level. The automatic shut-off subsystem generally includes spout 28 having conduit 202 travelling therethrough, flexible hose 208, circuit board 212, trigger assembly 50 and valve assembly 40.

Figure 11:
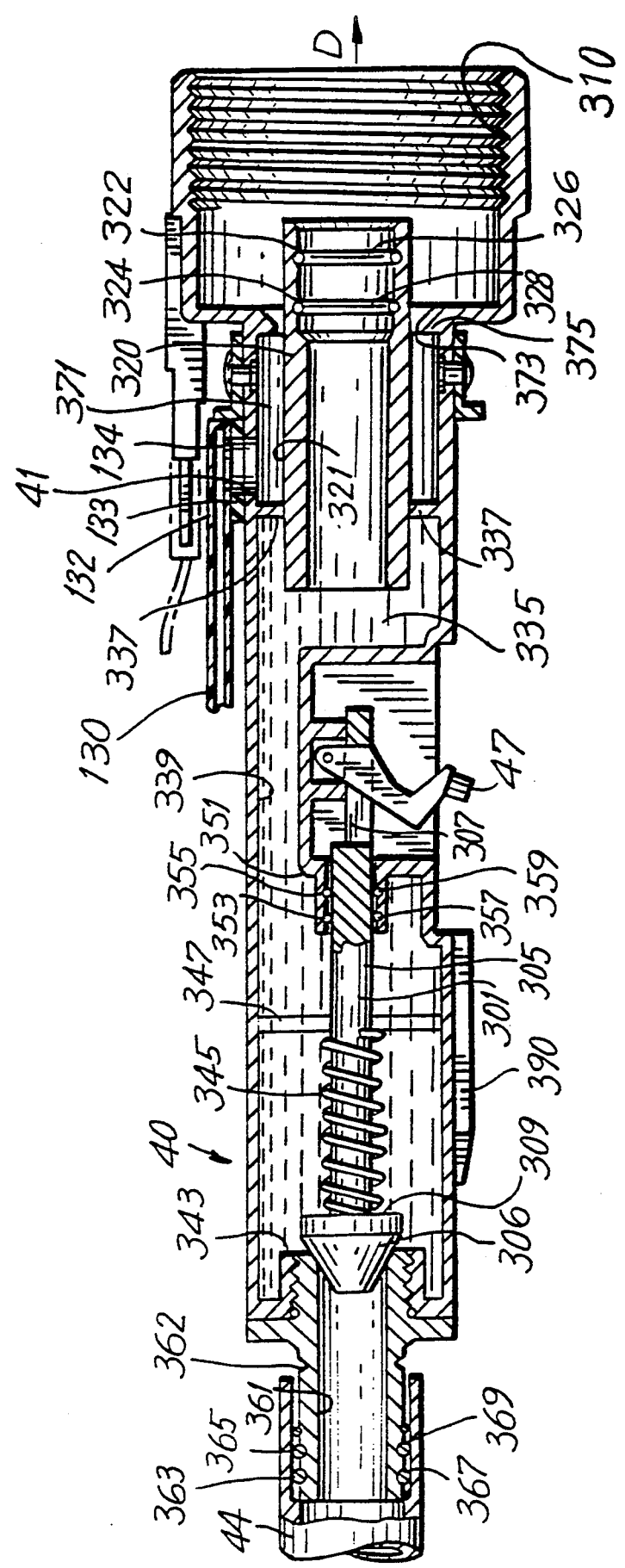
FIG. 11 is an enlarged partial cross-sectional view of the valve assembly.

FIG. 11 illustrates the inner elements of valve assembly 40, which includes a receiving end 26 and a dispensing end 42. Receiving end 26 includes internal threads 310 for engaging the external threads (not shown) of a distribution hose 22. Fuel enters receiving end 26 of valve assembly 40 and travels into inlet conduit 320. Inlet conduit 320 includes an annular female coupling having two circumferentially radially extending grooves 322, 324 for receiving two O-ring gaskets 326, 328. O-ring gaskets 326, 328 are provided to produce a seal between the female portion of inlet conduit 320 and an annular male portion of the distribution hose received therein (not shown).

A reservoir 335, shown in FIG. 11, is essentially cylindrical in shape and the body thereof is defined by inner wall 339 of valve assembly 40. A first radially inwardly extending retaining wall 337 extends radially between the inner wall 339 of valve assembly 40 and the outer wall 321 of inlet conduit 320 and forms one end of the cylinder. A second fluid impervious wall is defined by the intersection of head 306 of plunger 301 which is normally biased against a shoulder 343 of valve assembly 40 and forms the second end of the cylinder.

Plunger 301 (shown in FIG. 11) includes head 306 and a shaft 305. Shaft 305 is coupled to an engagement portion 307 of pivot arm 47. A helical biasing spring 345 extends between head 306 of plunger 301 and radially inwardly extending fingers 347 of inner wall 339 of valve assembly 40. The helical biasing spring 345 normally biases head 306 of plunger 301 against shoulder 343 due to the force exerted between radially inwardly extending fingers 347 and the ledge 309 of head 306. As a result, plunger 301 is normally biased in a direction opposite to arrow D of FIG. 11 and fluid does not pass through the fluid impervious wall formed by head 306 of plunger 301. This is because plunger 301 bears against shoulder 343 and blocks off discharge end 42 of valve assembly 40.

Shaft 305 of plunger 301 passes through an annulus 351 in valve assembly 40 in order to allow shaft 305 to be coupled to engagement portion 307 of pivot arm 47. Two O-ring gaskets 353 and 355 are seated within recesses 357 and 359 in order to create a fluid tight seal between annulus 351 and shaft 305.

When pivot arm 47 is activated, as described hereinbelow, by a user squeezing trigger assembly 50, pivot arm 47 of valve assembly 40 moves in a direction of arrow D in FIG. 11. Pivot arm 47 is coupled to engagement portion 307 and causes same to move in the direction of arrow D. Engagement portion 307 causes shaft 305 of plunger 301 to move in the direction of arrow D. Accordingly, head 306 of plunger 301 moves in the direction of arrow D and breaks the seal between head 306 and shoulder 343. As a result, fluid exits discharge end 42 of valve assembly 40 through outlet tube 361.

With reference to FIG. 11, valve assembly 40 includes a pair of axially extending walls 390 (only one shown) disposed on either side of pivot arm 47. Walls 390 form a track to receive elongated body 82a of push link 82 of trigger assembly 50 discussed hereinbelow. The track maintains push link 82 in contact with pivot arm 47. Furthermore, housing 100 is formed with extrusions (not shown), that engage walls 390 when valve assembly 40 is inserted and removed from housing 100.

With particular reference to FIG. 5, spout 28 is depicted in cross-section. Spout 28 is preferably formed by extrusion from a tubular pipe member and comprises an outer cylindrical member 102 and an inner concentrically disposed cylindrical member 103. Outer cylindrical member 102 and inner cylindrical member 103 are connected together by a series of longitudinally and continually extending ribs 104 which define a plurality of continually extending channels 105. Ribs 104 maintain the structural integrity of spout 28 and provide appropriate support for outer member 102 and inner member 103. This is advantageous if spout 28 is made of a light weight metal such as aluminum.

Spout 28 includes bores 107 proximate to dispensing end 27 and bores 109 proximate receiving end 64. Each set of bores 107 and 109 pass through outer member 102, but not inner member 103. An annular collar 403 is coupled to the outer surface of outer cylindrical member 102 proximate receiving end 64 of spout 28 in order to provide a custom fit against nose 100d of housing 100.

In order to obtain fluid flow, trigger assembly 50, which is received within saddle 90 of housing 100, activates pivot arm 47 of valve assembly 40.

As shown in FIGS. 2 and 3, housing 100 is preferably formed of molded plastic and comprises multiple injection molded pieces. The pieces include a top cover 100b snap fit to main body 100a and a bottom cover 100c snap fit to the bottom of main body 100a. An injection molded plastic nose piece 100d is snap fit across top cover 100b, bottom cover 100c and main body 100a. Housing 100 as well as spout 28 and flow tube 46 are secured together by a screw 101 (best seen in FIG. 5). The main body 100a of housing 100 includes a saddle 90 for receiving trigger assembly 50 therein. Main body 100a of housing 100 also receives valve assembly 40 and flow tube 46 therein. Vapor tube 130 is disposed in axial alignment with valve assembly 40 and flow tube 46 and is located thereabove when viewed in elevation.

Fluid Distribution Subsytem

Reference is first made to FIGS. 2 and 3, which describe the elements and operation of the fluid distribution subsystem of nozzle assembly 28 in detail. Valve assembly 40 is releasably coupled to distribution hose 22, as shown in FIG. 1. This connection is normally made by distribution hose 22 having a male end with external threads for threadingly engaging valve assembly 40 having a female end with internal threads. This connection occurs at receiving end 26 of valve assembly 40.

In particular, inlet conduit 320 of valve assembly 40 receives an annular member (not shown) of distribution hose 22 therein and O-ring gaskets 326, 328 provide a fluid impervious seal. Valve assembly 40 is spring loaded in a normally closed position, as described above with regard to FIG. 11. Pressurized fluid entering receiving end 26 is not discharged out of discharging end 42 of valve assembly 40 unless pivot arm 47 of valve assembly 40 is activated by trigger assembly 50.

With particular reference to FIG. 11, discharge end 42 of valve assembly 40 includes an outlet tube 361, which is coupled to receiving end 44 of flow tube 46. Outlet tube 361 of valve assembly 40 is formed with grooves 367 and 369 about its outer circumference. Grooves 367 and 369 receive O-ring gaskets 363 and 365 therein. Outlet tube 361 of valve assembly 40 slides within receiving end 44 of the flow tube 46. O-ring gaskets 363 and 365 form a frictional seal with the inner annular wall of flow tube 46.

With particular reference to FIG. 3, flow tube 46 is essentially a cylindrical conduit that is bent at an obtuse angle to conform to the substantially gun-shaped configuration of dispensing nozzle 24. Receiving end 44 of flow tube 46 has an inner diameter sized to receive the outer diameter of outlet tube 361, as described above. Discharge end 48 of flow tube 46 includes an enlarged collar 49 designed with an internal circumferential surface adapted to receive a check valve assembly, generally indicated at 52 therein.

With particular reference to FIG. 5, check valve assembly 52 is depicted as including a basket 54, a helical biasing spring 56, a plunger 58 and a snap-in seat 60. Basket 54 is an annular structure having an open end 54a and a base 54b. Base 54b is a spider including a cylindrical boss 55 protruding axially therefrom. Helical biasing spring 56 is seated about the periphery of cylindrical boss 55 at one end and at the other end is seated against boss 57 of plunger 58. Helical biasing spring 56 normally biases head 59 of plunger 58 against snap-in seat in order to create an air tight seal. When pressure is exerted in the direction of fluid flow (Arrow A of FIG. 5), helical biasing spring 56 contracts and boss 57 of plunger 58 is received within boss 55 of basket 54.

As shown in FIG. 5 in cross-section, receiving end 64 of spout 28 is received within collar 49 of discharge end 48 of flow tube 46. Check valve assembly 52, described above, is locked in place between chamfered surface 29 of receiving end 64 of spout 28 and inner wall 401 of collar 49 of flow tube 46. A seal is created between spout 28 and flow tube 46 by three (3) O-ring gaskets 66, 68 and 70 which are seated within external grooves 65, 67 and 69 of spout 28. Furthermore, O-ring gaskets 66, 68 and 70 provide a frictional seal between receiving end 64 of spout 28 and discharge end 48 of flow tube 46. The fluid flows from flow tube 46 into inner cylindrical member 103. Fluid is then discharged out dispensing end 27 of spout 28.

With particular attention to FIG. 11, it can be seen that when trigger assembly 50 is activated plunger 301 moves in the direction of arrow D. Plunger head 305 moves away from shoulder 343 and allows pressurized fluid within cavity 335 to flow out of outlet tube 361 of valve assembly 40 and into receiving end 44 of flow tube 46.

Reference is now made to FIG. 3, where it is seen that fluid flows into receiving end 44 of flow tube 46 and moves freely to discharge end 48. With reference to FIG. 5, fluid must flow through the collar 49 of flow tube 46 and through check valve 52. The pressure of fluid flow allows the fluid to penetrate check valve 52 by causing plunger 58 to bear against and contract bias spring 56 in the direction of arrow A of FIG. 5. Thus, fluid flows through basket 54 and out discharge end 48 of flow tube 46. Fluid then flows into receiving end 64 of spout 28. In particular, fluid flows through inner cylinder member 103 of spout 28 and out dispensing end 27 and into the gas tank of an automobile or any other receptacle into which fluid is dispensed.

Vapor Recovery Subsytem

As noted above, there are other sub-systems of this nozzle assembly working simultaneously with the fluid discharge sub-system (described above). The second sub-system is the vapor recovery sub-system. Vapor is returned from the gas tank of the automobile which is receiving fuel through the spout of the nozzle assembly and into a vapor storage tank.

Inner cylindrical member 103 of spout 28 contains a fluid discharging cavity 151. Fluid flows within inner cylindrical member 103, as described below with regard to the fluid flow subsystem. A conduit 202 begins at bore 200 and ends at pressure tube 206. Conduit 202 forms a passage through inner cylindrical member 103 and outer cylindrical member 102. Conduit 202 is used in sensing fluid level in the fuel tank during fuel tank refilling, as described in more detail below. Channels 105 are provided for recovering fuel vapor during fuel dispensation as described below.

Reference is made to FIGS. 5 through 7, wherein outer cylindrical member 102 of spout 28 includes a plurality of bores 107 cut therethrough, but not through inner cylindrical member 103. Bores 107 allow for vapor to pass into channels 105. Channels 105 provide for the diffusion of fuel vapor from a position proximate dispensing end 27 of spout 28 to a position proximate end 64 of spout 28. A plurality of enlarged bores 109 are provided about the circumference of outer cylindrical member 102 and communicate with channels 105. In FIG. 3, it is clearly illustrated that the vapor that traveled into bores 107 is later emitted from bores 109.

With reference to FIG. 3, a vapor tube 130 transmits vapor from spout 28 to valve assembly 40. Vapor tube 130 is formed of plastic (for example polyvinylchloride) and is substantially oval in cross-section. Vapor tube 130 includes a bellows region 132 to allow vapor tube 130 to bend and thereby conform to the gun shape (obtuse angle) of flow tube 46.

With particular reference to FIG. 5, a receiving end 131 of vapor tube 130 is positioned to receive vapor from bores 109 of spout 28. This is accomplished by the front edge 401 of nose piece 100d being pressure fit to bear against chamfered surface 405 of collar 401 of spout 28 in order to create an air tight seal. Furthermore, collar 49 of flow tube 46 includes a groove 407 provided about its outer circumference for receiving an O-ring gasket 409. Collar 49 of flow tube 46 is frictionally fit by O-ring gasket 409 against nose 100d.

Accordingly, an air space 415 is formed between nose 100d, collar 403 of spout 28, and O-ring gasket 409 of collar 49 of flow tube 46. All vapor emitted through any of bores 109 is released into air space 415. The vapor trapped in air space 415 can then travel through bore 417 through nose 100d and into receiving end 131 of vapor tube 130. The vapor then travels through vapor tube 130 and out discharge end 132.

Figure 8:
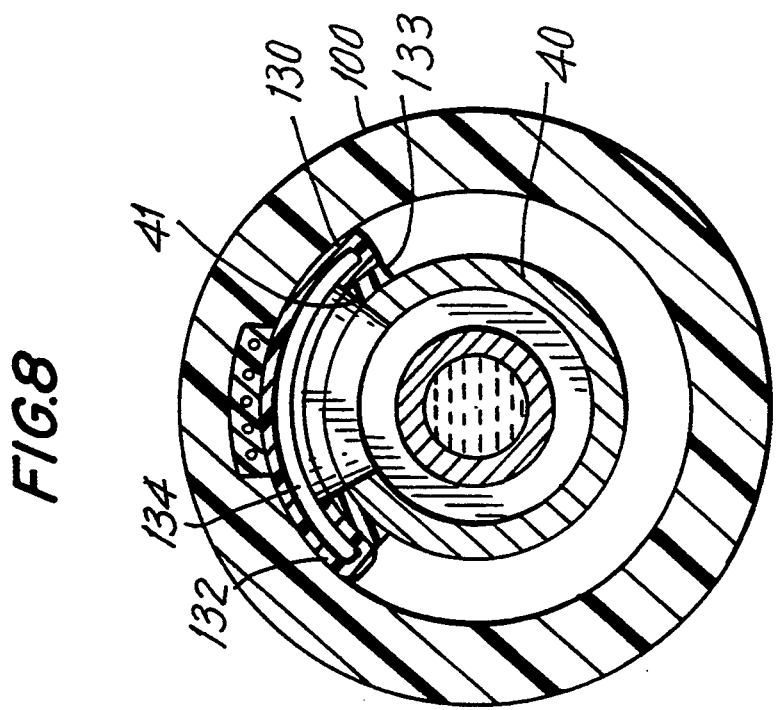
FIG. 8 is a cross-sectional view taken along line 8—8 of FIG. 3 and depicts the valve assembly within the housing.

With particular reference to FIGS. 3, 8 and 11, the discharge end 132 of vapor tube 130 includes an opening 134. Valve assembly 40 includes a contralateral opening 41 for vapor to be communicated between opening 134 of vapor tube 130 and opening 41 of valve assembly 40. A gasket 133 is adhered around opening 134 to provide a sufficient seal (air tight not required) between opening 134 of vapor tube 130 and opening 41 of valve assembly 40.

With reference to FIG. 11, valve assembly 40 includes a vapor reservoir 371 that receives the gas vapor from discharge end 132 of vapor tube 130. Vapor reservoir 371 occupies the annular space between inner surface 339 of valve assembly 40 and the outer surface 321 of inlet conduit 320. The annular vapor reservoirs 371 has a first side wall formed by retaining wall 337 and a second sidewall formed by front wall 373. An annular air space 375 exists between front wall 373 of reservoir 371 and the outer surface 321 of inlet conduit 320. Air space 375 communicates with distribution hose 22 to allow gas vapor from vapor reservoir 371 to pass to a vapor storage tank not shown. Distribution hose 22 is formed of an inner cylindrical conduit and an outer cylindrical conduit and an annular space is formed therebetween (not shown). The inner conduit allows fluid to pass therethrough, and the annular space allows vapor to pass therethrough.

Fluid Level Sensing

The third pathway in nozzle assembly 24 relates to the automatic shut off of fluid flow. With reference to FIG. 5, a bore 200 extends through dispensing end 27 of spout 28. Bore 200 is coupled to a conduit 202, which travels within inner cylindrical member 103 and penetrates through outer cylindrical member 102 and inner cylindrical member 103 at bore 204. Bore 204 of spout 28 is aligned with bore 205 formed through collar 49 of flow tube 46. Bore 205 feeds into pressure tube 206 of flow tube 46. Flexible tube 208 is coupled to pressure tube 206 at a first end and is coupled to circuit board 212 at a second end. Circuit board 212 is connected by an electromechanical transducer to trigger assembly 40. When the fluid in the gas tank reaches a predetermined level, the electromechanical element disables the trigger assembly 40 and no fluid flows through nozzle assembly 24.

First Breakaway Feature

With particular attention to FIGS. 3A and 7, the first breakaway feature is disclosed. The first breakaway feature is generally indicated at 110 and is located proximate to receiving end 64 of spout 28. As described hereinabove, a plurality of radially extending bores 109 are provided for allowing the vapor travelling through channels 105 to be received in receiving end 131 of vapor tube 130. However, if this was the only function being served by the bores, they could more easily be formed in a manner similar to opening 41 in valve assembly 40, with only one opening contralateral to the receiving end 131 of vapor tube 130. However, the proximity of the bores 109 to each other and their continual pattern around the circumference of outer cylinder member 102 provides a calculated weak spot in spout 28.

Specifically, spout 28 includes a weak spot through line 7—7 of FIG. 5. Accordingly, when pressure is exerted in a direction orthogonal to the direction of fluid flow through spout 28, and that pressure is received on opposite sides of the break point, a torque is exerted across the break point. The break point is generally indicated as 110, and the torque exerted through the bores 109 causes the spout to bend and eventually crack, leaving the remaining portion of the nozzle assembly 24 intact. FIG. 3A illustrates a spout after the exertion of the breakaway force in an orthogonal direction.

Due to the nature of the first breakaway, it is most proper to refer to the force required to cause a fracture as a torque or moment force at a certain distance. Based on test results of the preferred embodiment, it is desirable to have the spout fracture upon exertion of at least 150 foot pounds of torque about the break point.

Second Breakaway Feature

Figure 4:
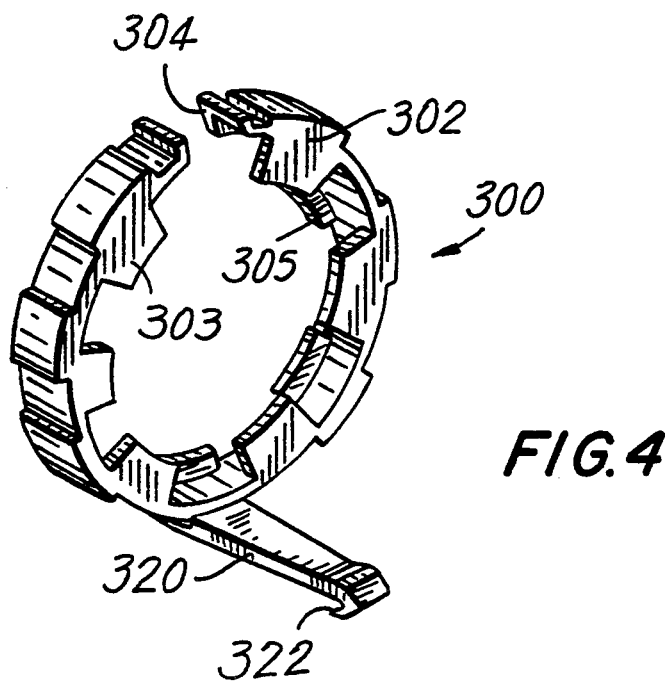
FIG. 4 is a perspective view showing the breakaway clip that is used to connect the handle and valve members.

Particular attention is now directed to FIGS. 4 and 10—10a, wherein the operation of the breakaway clip, generally indicated at 300, is disclosed. Breakaway clip 300 is provided for coupling valve assembly 40 to housing 100.

Breakaway clip 300, preferably made of a plastic material, as best illustrated in FIG. 4, is a generally annular structure and includes a corrugated outer surface. The circumference of the annular structure of breakaway clip 300 includes a small cutout portion to allow clip 300 to open and close. Breakaway clip 300 includes an annular front surface 302 having a plurality of radially inwardly extending larger teeth 303. Breakaway clip 300 also includes an annular rear surface 304 having a plurality of radially inwardly extending smaller teeth 305. Radially inwardly extending teeth 300 extend further inwardly then inwardly extending teeth 305.

With particular reference to FIGS. 10 and 10A, smaller teeth 305 of rear surface 304 are designed to engage groove 103 of main body 100a of housing 100. Larger teeth 303 of front surface 302 are designed to block flange 39 of valve assembly 40 from moving out of opening 100e of main body 100a of housing 100.

The breakaway feature of breakaway clip 300 is clearly depicted when comparing FIGS. 10 and 10A. In FIG. 10, small teeth 305 of rear surface 304 are seated within groove 103 of housing 100 and large teeth 303 of front surface 302 extend beyond the opening 100e of housing 100 and bear against flange 39 of valve assembly 40. As a result, valve assembly 40 cannot be removed from housing 100.

FIG. 10A indicates that when a pressure or force in the direction of arrow C of FIG. 10A is exerted upon valve assembly 40, and the force is above a predetermined level, either small teeth 305 or larger teeth 303 of breakaway clip 300 will break. Once small teeth 305 or large teeth 303 break, valve assembly 40 is easily removed from housing 100 in the direction of arrow C.

Based on testing of the assembly, it is preferred to have the valve assembly 40 released from housing 100 upon application of a force of at least 240 pounds. Thus, clip 300 couples valve assembly 40 and housing 100, and is also constructed in a configuration, in order to selectively fracture upon application of a force of at least this amount. Moreover, although it is preferred that fracture will take place when a force is applied in the direction of arrow C as shown in FIG. 10A, the nozzle assembly 24, including clip 300, valve assembly 40 and housing 100, is preferably constructed so that clip 300 will fracture if a force is applied at an angle with respect to the direction of arrow C.

In a typical driveaway situation, a car having the spout 28 of the nozzle assembly 24 in its gas tank will drive away in a direction opposite to arrow C in FIG. 10A. Valve assembly 40, which is screwed into distribution hose 22, is only displaceable the length of distribution hose 22. Once the distribution hose 22 is taut between the automobile and the gas pump, valve assembly 40 will stop moving with the automobile. Accordingly, one element of nozzle assembly 24 must give or the hose or gas pump will break. Breakaway clip 300 is designed to be a weak point and fracture prior to distribution hose 22 or the gas pump. Depending upon the thickness of plastic used, or the number of teeth, the strength of breakaway clip 300 can be selectively varied.

Breakaway clip 300 also includes a projection 320. Projection 320 includes a radially outwardly extending hook 322, as shown in FIG. 4. Hook 322 is provided for engaging a lip (not shown) of the inner circumferential wall of cowling 330 (see FIG. 2), thereby locking cowling 330 in place. Cowling 330 is cylindrical in shape and is designed to fit over breakaway clip 300 and receiving end 26 of valve assembly 40.

Cowling 330 includes a front 332 and a back 334. The inner front surface 332 of cowling 330 includes a plurality of ridges for engaging the corrugated outer surface of breakaway clip 300. Appropriate meshing of the ridges of cowling 330 with the corrugated outer surface of breakaway clip 300 insures proper alignment of breakaway clip 300 within cowling 330. This enables hook 332 of breakaway clip 300 to engage the lip (not shown) in the inner circumferential wall of cowling 320.

When hook 322 is engaged to the lip of cowling 330, cowling 330 cannot be removed. Accordingly, breakaway clip 300 is shielded, so that breakaway clip 300 cannot be exposed. As a result, nozzle assembly 34 cannot be easily removed from valve assembly 40 and distribution hose 22.

Cowling 330 is provided with a small hole therethrough (not shown). The hole is provided in registration with the lip (not shown) to receive a pin therein for disengaging hook 322 of projection 320 so that cowling 330 can be removed from locking engagement with breakaway clip 300 when such removal is in fact desired. Third Breakaway Feature A third breakaway feature is provided to break when a force is applied to nozzle assembly 24 that does not cause the first or second breakaway feature to fracture. This breakaway feature is not illustrated in the drawings in the broken condition.

The third breakaway feature is comprised of the structure of housing 100 which includes main body 100a, top cover 100b, bottom cover 100c and nose 100d all formed of injection molded plastic. A predetermined designed weak spot substantially in the center of main body 100a of housing 100 is designed in the nozzle assembly. Housing 100 can include a score line to provide a weak point in the plastic housing. The weak spot of housing 100 is aligned with the intersection of discharge end 42 of valve assembly 40 and receiving end 44 of flow tube 46. In particular, as seen in FIG. 11, outlet tube 361 of nozzle assembly 40 includes a sheer grove 362 disposed about the circumference thereof. Sheer grove 362 is offset from the intersection of outlet tube 361 and the side wall of the nozzle assembly. Furthermore, outlet conduit 361 is received in receiving end 44 of flow tube 46. However, sheer grove 362 is not received within receiving end 44 of flow tube 46. Accordingly, sheer grove 362 is a calculated weak point.

In some situations, when a pressure is exerted upon the nozzle assembly in a direction that is neither orthogonal to fluid flow in the spout, nor in a direction axial to the valve assembly 40, the third breakaway feature is used. In this situation, break point number three provides a fail safe break point. The outlet conduit 361 includes sheer groove 362 which is a weak point. Housing 100 preferably including a score line. The score line in the housing and sheer groove 362 of valve assembly 40 provides a break point, such that housing 100 and outlet conduit 361 can both fracture without losing the integrity of valve assembly 40.

Accordingly, the third breakaway feature is provided so that main body 100 will break down before the gas pump or distribution hose 22. Furthermore, valve assembly 40 will remain with distribution hose 22, and the remainder of nozzle assembly 24 (trigger assembly 50, flow tube 46 and spout 28) will leave with the automobile.

Accordingly, it can be seen that the present invention provides for three distinct breakaway features. When a predetermined force is applied in a direction orthogonal to fluid flow in spout 28, axial to fluid flow in valve assembly 40, or in certain situations the housing will fracture as a fail safe. In each situation, a substantial portion of nozzle assembly 24 is saved and no damage is done to the gas pump or hose.

Having the nozzle assembly remain with the distribution hose not only saves money, as described above, but also serves to prevent fluid flow through distribution hose 22. As described above with regard to fluid dispensation, valve assembly 40 does not allow fluid to flow therethrough unless pivot arm 47 is activated by push link 82. Obviously, during breakaway, push link 82 cannot activate pivot arm 47 and, accordingly, no fluid is dispensed through valve assembly 40. Accordingly, unlike the prior art devices discussed hereinabove, this assembly requires only one (1) valve and does not require additional valves in the distribution hose 22. The same valve is used for operating the nozzle assembly 24 during operation and preventing fluid flow during driveaway.

It will thus be seen that the objects set forth above among those made apparent from the preceding description, are efficiently attained, and since certain changes may be made in the above constructions without departure from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which as a matter of language might be said to fall therebetween.

What is claimed:

1. A fuel system nozzle for use with a fuel dispensing system including a fuel dispenser and a fuel dispensing hose, comprising:
    a housing having at least one opening located at one side thereof;
    a trigger located on the housing;
    a dispensing valve selectively removable from within said housing and through said at least one opening, said dispensing valve selectively coupleable to said fuel dispensing hose;
    a spout member located substantially opposite said at least one opening;
    means for maintaining said dispensing valve within said housing, said maintaining means adapted to withstand application of a predetermined pulling force tending to separate said dispensing valve from within said housing, so that when a pulling force greater than said predetermined force is applied between said spout and said dispensing hose, said maintaining means will fracture and said valve will separate from said housing and stay with said dispensing hose; and
    a linear member coupled to said trigger and disposed in said housing, said linear member located proximate to said dispensing valve such that activation of said trigger translates via said linear member to cause said dispensing valve to open.

2. The fuel dispensing nozzle of claim 1, wherein said spout member includes a first fluid pathway and said dispensing valve includes a second fluid pathway in communication with said first fluid pathway.

3. The fuel dispensing nozzle of claim 2, further comprising a flow tube having a third fluid pathway, said third fluid pathway coupling said first fluid pathway to said second fluid pathway.

4. The fuel dispensing nozzle of claim 3, wherein said spout member has a first end and a second end;
    a longitudinally extending annular inner member defining said first pathway; and
    a longitudinally extending annular outer member disposed about said inner member and defining a space therebetween.

5. The fuel dispensing nozzle of claim 4, wherein said spout member includes a series of circumferentially disposed apertures formed therein.

6. The fuel dispensing nozzle of claim 5, wherein said apertures are formed through said longitudinally extending outer member 7. The fuel dispensing nozzle of claim 5, wherein said apertures define a substantially annular location along said spout adapted to selectively fracture when a second predetermined force is applied to said spout.

8. The fuel dispensing nozzle of claim 1, wherein said maintaining means comprises an annular clip member for selectively coupling said dispensing valve to said housing.

9. The dispensing nozzle of claim 8, wherein said clip member comprises plastic.

10. The dispensing nozzle of claim 8, wherein said clip member includes an open portion.

11. The fuel dispensing nozzle of claim 1, wherein said maintaining means is adapted to withstand application of a force of at least 240 pounds.

12. The fuel dispensing nozzle of claim 1 wherein said dispensing valve comprises:
    a cylindrical member;
    a shoulder portion within said cylindrical member;
    a plunger arranged to selectively allow the flow of fuel when said plunger is disengaged from said shoulder portion, and to block the flow of fuel when said plunger is in contact with said shoulder portion.

13. The dispensing nozzle of claim 12 wherein said plunger is in the normally closed position.

14. A fuel dispensing nozzle comprising a housing having at least one opening, a dispensing valve selectively removable from within said housing and through said at least one opening, and means for maintaining said dispensing valve within said housing, said maintaining means adapted to withstand application of a force tending to separate said dispensing valve from within said housing, and said maintaining means comprising an annular clip member for selectively coupling said dispensing valve and said housing, said annular clip member having a substantially cylindrical configuration with a first annular end having a plurality of radially inwardly extending teeth disposed thereabout and a second annular end having a plurality of radially inwardly extending teeth disposed thereabout.

15. The fuel dispensing nozzle of claim 14, wherein said plurality of teeth of said first annular end extend further radially inwardly than said plurality of teeth of said second annular end.

16. The fuel dispensing nozzle of claim 14, wherein said housing comprises an annular groove about its circumference for receiving the teeth disposed about said second annular end and said teeth disposed about said first annular end of said clip member extend into said at least one opening of said housing.

17. The fuel dispensing nozzle of claim 16, wherein said dispensing valve comprises a radially outwardly extending annular surface positioned to be in axial alignment with said at least one opening of said housing.

18. The fuel dispensing nozzle of claim 17, wherein said radially outwardly extending annular surface includes at least one sidewall defining a ledge substantially orthogonal to the annular surface and said plurality of radially inwardly extending teeth disposed about said first annular end of said clip member bear against said at least one sidewall of said radially outwardly extending annular member when said dispensing valve is disposed within said at least one opening.

19. The fuel dispensing nozzle of claim 14, wherein said teeth of said first annular end and said second annular end are adapted to fracture if a force exceeding the first predetermined force is applied tending to separate the dispensing valve from the at least one opening in the housing.

20. A fuel dispensing nozzle for use with a fuel dispensing system including a fuel dispenser and a fuel dispensing hose, comprising:
   a housing having at least one opening located at one side thereof;
   a dispensing valve selectively removable from within said housing and through said at least one opening;
   a spout member located substantially opposite said at least one opening;
   said dispensing valve releasing from said housing upon application of a pulling force across said spout and said fuel dispensing hose greater than a predetermined pulling force in a direction axial to fluid flow within said dispensing valve; and
   said spout member having a substantially annular location therealong defined by a plurality of aperatures there-through and adapted to selectively fracture upon application of a torque across said spout and said fuel dispensing hose greater than a predetermined torque in a direction substantially orthogonal to fluid flow through said spout member.

21. The fuel dispensing nozzle of claim 20, wherein said spout member includes a first fluid pathway and said dispensing valve includes a second fluid pathway in communication with said first fluid pathway; and
   further including a flow tube having a third fluid pathway, said third fluid pathway coupling said first fluid pathway to said second fluid pathway.

22. The fuel dispensing nozzle of claim 21, wherein said spout member has a first end and a second end;
   a longitudinally extending annular inner member defining said first pathway; and
   a longitudinally extending annular outer member disposed about said inner member and defining a space therebetween.

23. The fuel dispensing nozzle of claim 20, wherein said annular location is adapted to selectively fracture upon application of at least 150 foot pounds of torque.

24. The fuel dispensing nozzle of claim 20, further comprising means for maintaining said dispensing valve within said housing adapted to withstand application of a force of at least 240 pounds in the direction axial to fluid flow in the dispensing member.

25. The fuel dispensing nozzle of claim 20, further comprising means for maintaining said dispensing valve within said housing, said maintaining means including an annular clip member for selectively coupling said dispensing valve to said housing; said annular clip member having a substantially cylindrical configuration with a first annular end including a plurality of radially inwardly extending teeth disposed thereabout and a second annular end including a plurality of radially inwardly extending teeth disposed thereabout.

26. The fuel dispensing nozzle of claim 25 wherein said plurality of teeth disposed about said first annular end extend further radially inwardly than said plurality of teeth disposed about said second annular end.

27. The fuel dispensing nozzle of claim 26, wherein said housing comprises an annular groove about its circumference for receiving the teeth disposed about said second annular end and said teeth of said first annular end of said clip member extend into said at least one opening of said housing.

28. The fuel dispensing nozzle of claim 27, wherein said dispensing valve comprises a radially outwardly extending annular surface positioned to be in axial alignment with said at least one opening of said housing and including at least one sidewall defining a ledge substantially orthogonal to the annular surface.

29. The fuel dispensing nozzle of claim 28, wherein said plurality of radially inwardly extending teeth disposed about said first annular end of said clip member bear against said at least one sidewall of said radially outwardly extending annular member when said dispensing valve is disposed within said at least one opening.

30. The fuel dispensing nozzle of claim 29, wherein said teeth of said first annular end and said second annular end are adapted to fracture if a force exceeding the first predetermined force is applied tending to separate the dispensing valve from the at least one opening in the housing.

31. A fuel dispensing nozzle comprising a house having at least one aperture located at a first end thereof, a dispensing valve selectively removable from within said housing through said at least one aperature, and a spout member for dispensing fuel located at a second end of said housing, said spout member having a substantially annular location therealong defined by a series of circumferentially disposed aperatures and adapted to selectively fracture along said annular location defined by said aperatures upon application of a torque greater than a predetermined torque.

32. The fuel dispensing nozzle of claim 31, wherein said spout member includes a first fluid pathway and said dispensing valve includes a second fluid pathway in communication with said first fluid pathway and a flow tube having a third fluid pathway, said third fluid pathway coupling said first fluid pathway to said second fluid pathway.

33. The fuel dispensing nozzle of claim 31, wherein said spout member has a first end and a second end;
   a longitudinally extending annular inner member defining said first pathway; and
   a longitudinally extending annular outer member disposed about said inner member and defining a space therebetween.

34. The fuel dispensing nozzle of claims 33, wherein said circumferentially disposed apertures are formed through said longitudinally extending outer member.

35. The fuel dispensing nozzle of claim 36, wherein such annular location is adapted to withstand application of at least 100 foot pounds of torque.

36. A fuel dispensing nozzle, comprising:
a housing having at least one opening;
a dispensing valve selectively removable from within said housing and through said at least one opening;
means for maintaining said dispensing valve within said housing, said maintaining means adapted to withstand application of a predetermined forced tending to separate said dispensing valve from within said housing; and
said housing and said dispensing valve each comprising a flange, and said maintaining means including a ring with a plurality of stubs thereon, said stubs being arranged to engage said flanges, thereby preventing separation of said dispensing valve from said housing.

* * * * *